Jan. 11, 1949.    W. WORTH    2,458,547
VALVE FOR OIL TEMPERATURE CONTROL UNITS
Filed Dec. 8, 1944    2 Sheets-Sheet 1
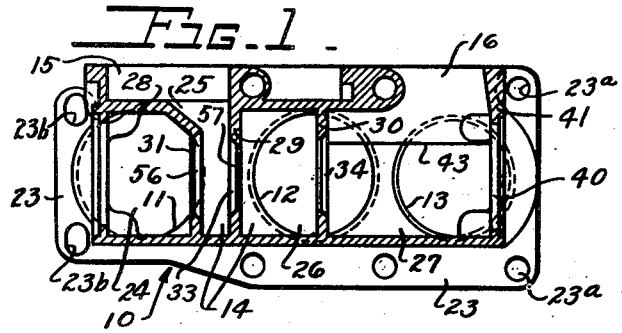
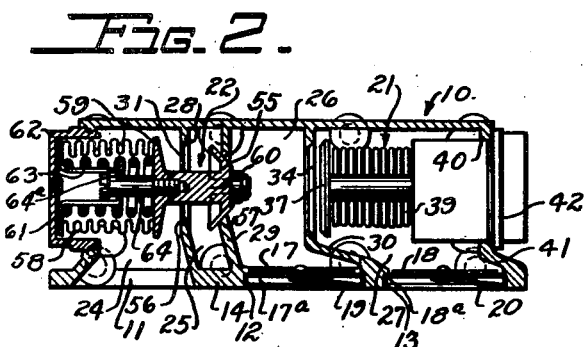
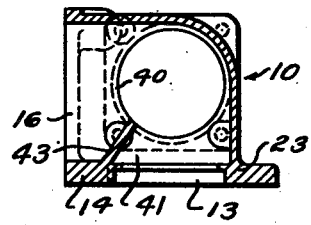
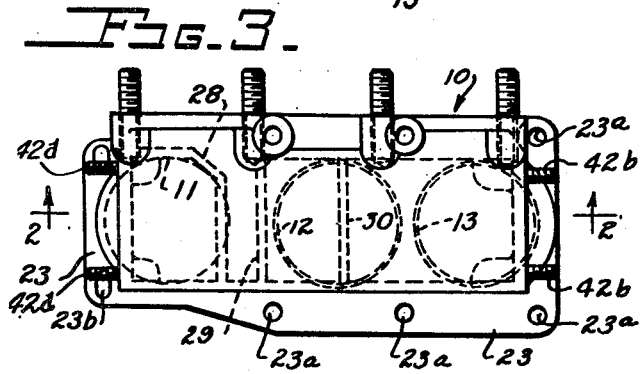
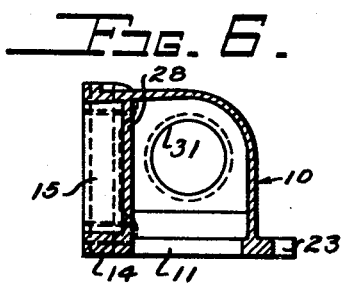
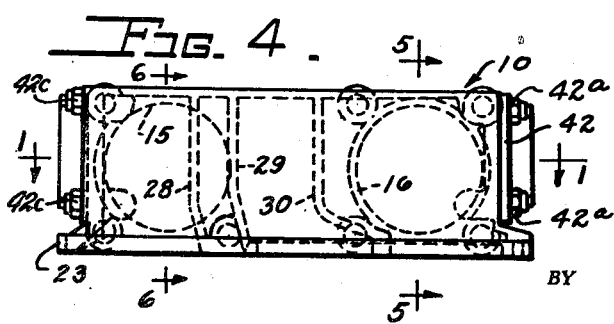
INVENTOR
WELDON WORTH
BY
ATTORNEYS Jan. 11, 1949. W. WORTH 2,458,547
VALVE FOR OIL TEMPERATURE CONTROL UNITS
Filed Dec. 8, 1944 2 Sheets-Sheet 2
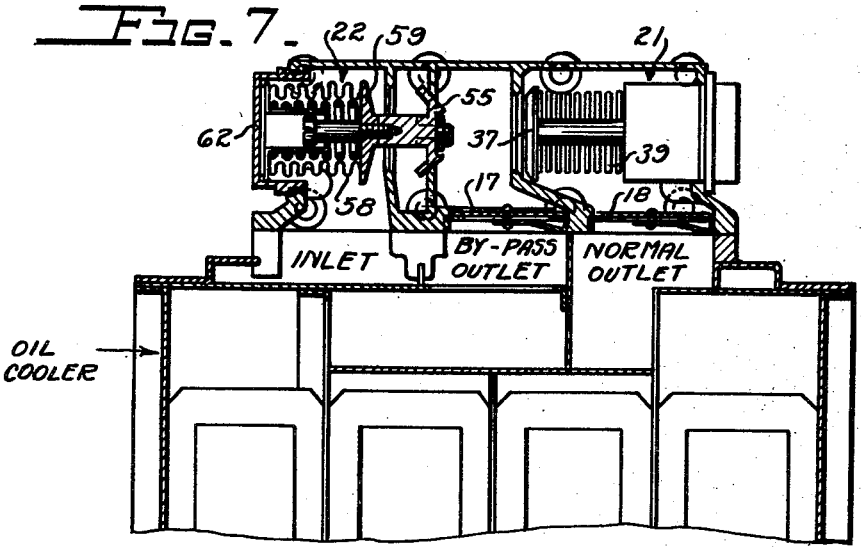
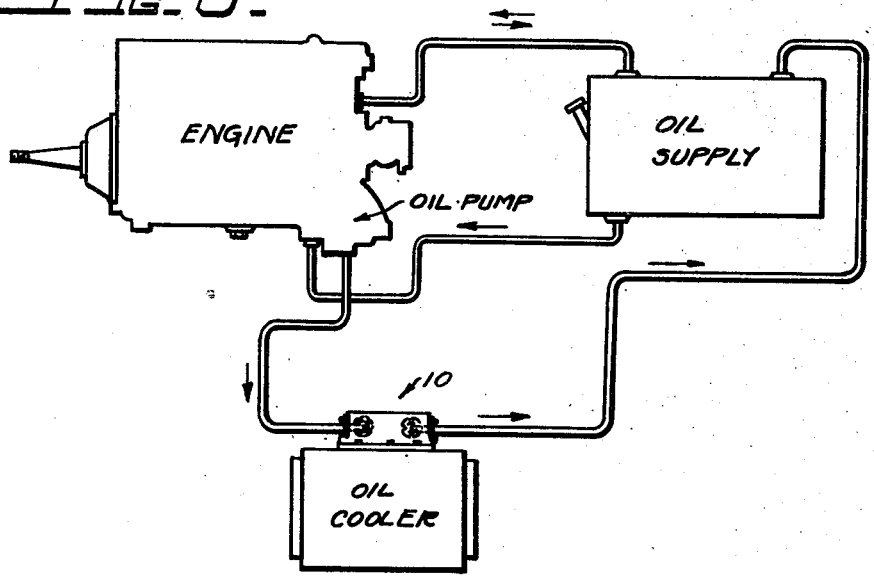
INVENTOR.
WELDON WORTH
BY
ATTORNEYS Patented Jan. 11, 1949

2,458,547

UNITED STATES PATENT OFFICE 2,458,547

VALVE FOR OIL TEMPERATURE CONTROL UNITS

Weldon Worth, Dayton, Ohio

Application December 8, 1944, Serial No. 567,288

5 Claims. (Cl. 236—34)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to valves for oil temperature control units and the like. In the lubrication systems of aircraft engines it is usually necessary to cool the oil after it passes through the engine in order to maintain its temperature at the desired level and consequently obtain the proper viscosity. The oil cooler in such a system must have ample cooling capacity for the most severe or abnormal conditions and will therefore have excess capacity for normal operating conditions. If over-cooling is to be prevented, it is necessary to have means for limiting the amount of cooling effect according to operating conditions. Many oil coolers are designed with a by-pass and accomplish temperature control by directing the oil, when cold, through the by-pass instead of through the cooling element of the apparatus.

The general object of the invention is to provide a practicable valve unit which will regulate automatically the amount of oil flowing through the oil cooler, hence will regulate the amount of cooling, so that the desired temperature regulation may be obtained. Another object is to provide a valve unit which will act responsive to surges and high pressures to by-pass the oil through the valve unit body, thereby to protect the oil cooler against damage. Other general objects are to provide a valve unit which is compact, of light weight, and is reliable and safe in operation. More specific objects will be explained in connection with the following description of the preferred embodiment of the invention shown in the accompanying drawings, wherein:

Fig. 1 is a horizontal longitudinal section through the valve unit, the section being on line 1—1 of Fig. 4, and the valve members being omitted;

Fig. 2 is a vertical medial longitudinal section, on line 2—2 of Fig. 3, showing the valve members;

Fig. 3 is a top plan view of the valve unit;

Fig. 4 is a side elevation of the valve unit;

Fig. 5 is a vertical cross section on line 5—5 of Fig. 4;

Fig. 6 is a vertical cross section on line 6—6 of Fig. 4;

Fig. 7 is a fragmentary vertical sectional view showing the valve unit mounted on an oil cooler unit in operative relationship thereto; and Fig. 8 is a diagrammatic view showing a lubricating system with which a valve unit embodying the invention may be used.

The valve unit of the present invention is preferably used with one of the oil temperature control or cooler units disclosed in my pending application filed December 11, 1944, Serial No. 567,764, now Patent No. 2,453,737, dated November 16, 1948, and is an improvement over the valve units disclosed in my Patent No. 2,279,285 dated April 7, 1942. In a companion application Serial No. 567,289, filed concurrently herewith, now Patent No. 2,454,297, dated November 23, 1948, I disclose another form of valve unit which likewise automatically by-passes the oil when the pressure reaches a certain figure.

Referring particularly to the drawings, the valve body 10, which may be made of an aluminum alloy or other light weight metal casting, has ports 11, 12, and 13 in its bottom wall 14, said ports being provided for flow of oil and being adapted to register respectively with the oil cooler inlet, the oil cooler by-pass and the oil cooler outlet, as will be clear from Fig. 7. In addition, the valve body has an inlet port 15 and an outlet port 16, Fig. 1. A pair of flap type check valves 17 and 18 are held on valve seats 17a, 18a by springs 19 and 20 respectively to close ports 12 and 13 respectively, said check valves however yielding to fluid pressure from the oil as it flows out of the oil cooler and then being lifted off said seats to permit oil to flow to the interior of the valve body. Valve seats 17a, 18a are each preferably disks press-fitted into bores provided in the bottom wall 14. For controlling flow of oil through the valve unit body, a thermal-controlled by-pass and pressure relief valve 21 and a pressure-controlled surge-protecting valve 22, both of which will be described later, are located within the valve body. A marginal flange 23 is integral with and projects from the valve body on three sides in the plane of the bottom wall 14, and has apertures 23a, 23b for studs (not shown) or the like, to secure the valve body to the top of the oil temperature control unit of my application, identified above, or to a similar unit, and in operative relationship thereto, in the manner shown in Fig. 7.

The general shape of valve unit body 10 is preferably that of a parallelopiped and it is closed except for the ports already mentioned, with its interior divided into chambers 24, 25, 26, and 27 by partitions 28, 29, and 30, these partitions preferably being integral with the walls of the valve body. Oil enters the valve body through inlet port 15 and passes into chamber 25, from which there are two outlets, the normal outlet being through valve port 31 to chamber 24 which contains the pressure-responsive surge-protecting valve 22. From chamber 24 the normal flow is through port 11 to the inlet of the oil cooler unit. However, in the event of a surge, or an increase in oil pressure beyond a certain predetermined point, because of the construction of valve 22, port 31 will be closed and the oil will flow through valve port 33 into chamber 26, and through valve port 34 in partition 30 into chamber 27, and out through outlet 16, hence will not even enter the oil cooler. Thus the oil cooler with its relatively thin walls will be protected against the destructive effects of excessive pressure.

If the thermal-controlled valve 21 permits, oil may also enter the valve unit body through valve port 12 which registers with the by-pass outlet of the oil cooler, the oil flowing past check valve 17 and into chamber 26, thence through valve port 34 and into chamber 27, past valve 21 and out through outlet 16. The thermal-controlled valve 21 comprises in general the valve poppet 37 and a thermostatic element 39 which holds the valve open when it is cold and moves the valve poppet 37 to the closed position, closing port 34, at the desired temperature. Valve 21 is clamped in an opening 40 in the end wall 41 of the valve unit body, by a plate 42 secured by nuts 42a engaging studs 42b or by other known means. Valves of this type are disclosed in my patent No. 2,279,285 and in my pending application Serial No. 373,150, filed January 4, 1941, entitled "Temperature control unit," now Patent No. 2,419,980, dated May 6, 1947. If a flexible metal bellows (as shown) is used, a charge of expansible fluid that completely fills the bellows with liquid at the cold position may be desirable to obviate collapsing the bellows during the high initial pressures.

By the described construction, oil from the normal outlet of the oil cooler may continually flow past check valve 18 into the valve unit body, and out through outlet 16, passing around the thermostatic element 39 and hence subjecting the latter to its heat. This flow of oil is forced to move in one direction around the thermal-responsive bellows 39 because of a deflector 43 (Figs. 1 and 5) which projects upwardly from the bottom wall of chamber 27 at an angle of about 45°, and substantially contacts the bellows 39 with its upper edge, though without interference with the action of the bellows. Thus oil flowing through port 13 does not pass immediately out through outlet 16 but subjects the bellows to its heat by flowing over approximately three-quarters of the periphery of the bellows before reaching said outlet. Oil from the by-pass portion of the cooler unit, when valve poppet 37 is off its seat, may also flow past check valve 17 and into chambers 26 and 27, thence out through said outlet. The thermostatic element 39 may thus be simultaneously subjected to both warm oil from the by-pass portion of the cooler, and cool oil from the cooling pass of the cooler, and under these conditions it will respond to the average temperature of the entire oil flow rather than to the temperature of the warm oil alone or the cool oil alone.

The removable pressure-controlled surge protecting valve 22 comprises a double valve poppet 55 which is adapted to seat on a valve seat 56 in partition 28 or on a valve seat 57 in partition 29, as it is moved by expansion or contraction respectively of pressure-responsive element 58. The latter element may be a flexible metal bellows, and has a diaphragm 59 fixed to one end to which a valve stem 60 is secured, the other end of the valve stem being attached or secured to valve poppet 55. The pressure-responsive element or bellows 58 encloses a coil spring 61 under compression which at one end presses against diaphragm 59. A valve cap 62 may be screwed into the end of the valve body 10, and the end of the bellows 58 is sealed where connected to the said valve cap. The cap 62 may be held in place also by studs 42d having nuts 42c threaded thereon. A cage 63 may be secured at one end to the valve cap and may fit inside the coil spring 61 to hold the same against lateral shifting. As shown, cage 63 is interposed between spring 61 and valve cap 62 and hence spring 61 presses directly against cage 63, which transmits said pressure to the fixed valve cap. A stud 64 is screwed through diaphragm 59 and into the valve stem 60, thus securing the diaphragm on the valve stem, and has its slotted head 64a inside the cage 63, the stud 64 slidably fitting the cage so that free movement of diaphragm 59 will take place. The valve 22 is normally in extended or expanded position (Fig. 2) wherein the valve poppet 55 is seated on seat 57 to close port 33, but when the pressure of the oil in chamber 24 exceeds a predetermined value, diaphragm 59 will move to the left as viewed in Fig. 2, compressing spring 61 and reducing the volume of the bellows, and the valve poppet 55 will seat on seat 56 to close port 31 in partition 28. Oil flow will then proceed from inlet 15 (Fig. 1) to chamber 25, then through port 33, chamber 26, chamber 27 and out through outlet 16. This may be termed the "surge-protection path."

With positive displacement pumps as used in lubricating systems for aircraft engines, there is frequently an initial pressure of a very high value, sufficient to damage and perhaps burst the oil cooler. Any such pressure will move valve poppet 55 to the left as viewed in Fig. 2, closing port 31 and opening port 33. Port 34 is already open because the thermostatically controlled valve 21 is in the retracted or cold position. The oil will therefore follow the "surge-protection path" described above, until its pressure drops below a certain value. As the pressure decreases, spring 61 will move valve poppet 55 to the right, opening port 31 and closing port 33. Flow is thus established through inlet 15, chamber 25, chamber 24 and through port 11 to the by-pass passage of the oil cooler unit, as more fully explained in the aforesaid copending application Serial No. 567,764. At the flow-dividing point in said by-pass passage, the flow path is controlled by the position of the valve poppet 37 with reference to port 34, as determined by the thermostatic element 39. If valve poppet 37 is well spaced from said seat, the oil will flow through the oil cooler by-pass outlet port into chamber 26, through port 34, through chamber 27 and out through outlet 16. On the other hand, if valve port 34 is closed, the oil flow will then be down through the several passes in the oil cooler, coming out into chamber 27 and then out through outlet 16. Intermediate positions of the valve poppet 37 will permit flow through both paths, with partial closing of valve port 34.

It will be understood that valve 22 is inactive except in the event of a surge, and that it then acts immediately to by-pass all the oil through the valve body, thereby protecting the cooler.

The cooler is necessarily made of a multiplicity of thin-walled elements, some of which are soldered together, and it cannot be built to withstand the high pressure of a surge and still come within the weight and space limitations imposed by usage on aircraft. On the other hand, the described valve unit may be safely subjected to any pressure which the lubricating system itself may develop. Valve 21 is so built and located that it operates substantially independently of oil pressure within certain limits but is very sensitive to temperature changes and will close port 34 or partially close it during normal operation of the system, the position of valve poppet 37 constantly shifting toward or from its seat as the oil temperature rises and falls. Valve 21 may be adjusted to regulate the temperature within a narrow range.

While the valve unit of the invention has been described as a regulating and protective unit for the flow of lubricating oil through the lubricating system of an internal combustion engine, other liquids subjected to sudden changes in temperature and pressure could be controlled by devices embodying the invention. While the valve unit has been shown as an attachment for an oil cooler, it is probable that other apparatus may be advantageously used with the valve unit. I do not desire to be limited otherwise than is required by the appended claims.

What I claim is:

1. An oil cooler valve for operative association with a cooler having an inlet, a by-pass outlet and a normal outlet, and also a by-pass section around the cooler, said valve comprising a body having an inlet and an outlet and having four chambers in series, three ports in said valve body to provide communication between any two adjacent chambers, the first chamber communicating with the cooler inlet, the second with the valve inlet, the third with the cooler by-pass outlet, and the fourth with the cooler normal outlet and the valve outlet, a valve member movably mounted in said body, spring means to normally hold the member in position closing the port between the second and third chambers, pressure-responsive means in opposition to said spring means to move the member toward the port between the first and second chambers, and a thermal-responsive valve in the fourth chamber having an open position permitting oil to flow through the port between the third and fourth chambers and acting to reduce such flow when the temperature of the oil in said fourth chamber rises.

2. An oil cooler valve for operative association with a cooler, said valve comprising a hollow body having openings for connection with the cooler inlet, cooler by-pass outlet and cooler normal outlet, an oil inlet chamber in said body having spaced walls each with a port therein, an oil outlet chamber in said body having one wall provided with said cooler normal outlet opening and having another wall with a port therein, a by-pass outlet chamber between a ported wall of each of the first two chambers, a poppet valve member mounted for movement between the ports of said oil inlet chamber, spring means to normally hold the member in position closing the port adjacent the by-pass outlet chamber, pressure-responsive means in opposition to said spring means to move the member toward the other port leading to the cooler inlet opening, and a thermal-responsive valve in the oil outlet chamber having an open position permitting oil to flow through the ported wall of said chamber and acting to reduce such flow when the temperature of the oil in said chamber rises.

3. An oil cooler valve for operative association with a cooler having an inlet, a by-pass outlet and a normal outlet, said valve comprising a body enclosing an oil inlet chamber, a by-pass outlet chamber and an oil outlet chamber, said chambers being connected by ports to the cooler inlet, cooler by-pass outlet and cooler normal outlet respectively, a partition between the oil inlet chamber and the by-pass outlet chamber and a partition between the latter chamber and the oil outlet chamber, a valve seat in each partition, a spring-loaded poppet valve normally closing the seat in the first partition, pressure-responsive means connected to said valve to unseat the same under high-pressure surges of the oil entering the oil inlet chamber, and a thermal-responsive valve in the oil outlet chamber permitting flow past the seat in the second partition, but acting to reduce such flow when the temperature of the oil in said oil outlet chamber rises.

4. An oil cooler valve for operative association with a cooler having an inlet, a by-pass outlet and a normal outlet, and also a by-pass section around the cooler, said valve comprising a body having an oil inlet and an oil outlet and having four chambers in consecutive series, three valve ports within said valve body to provide direct communication between any two adjacent chambers, the first chamber communicating with the cooler inlet, the second with the valve inlet, the third with the cooler by-pass outlet, and the fourth with the cooler normal outlet and the valve outlet, a poppet valve member movably mounted within said valve body and being confined within the first and second chambers, spring means to normally hold said valve member in a position closing the port between the second and third chambers, a pressure-responsive bellows acting in opposition to said spring means under the influence of pressure surges of the oil entering the valve inlet to move said valve member from a position closing the port between the second and third chambers to a position closing the port between the first and second chambers, and a thermal-responsive valve member in the fourth chamber having an open position permitting oil to flow through the port between the third and fourth chambers and acting to close said port when the temperature of the oil in said fourth chamber rises.

5. An oil cooler valve for operative association with a cooler having an inlet, a by-pass outlet and a normal outlet, and also a by-pass section around the cooler, said valve comprising a body having an oil inlet and an oil outlet and having four chambers in consecutive series, three valve ports within said valve body to provide direct communication between any two adjacent chambers the first chamber communicating with the cooler inlet, the second with the valve inlet, the third with the cooler by-pass outlet, and the fourth with the cooler normal outlet and the valve outlet, a valve member movably mounted within said valve body and being confined within the first and second chambers, a coil spring to normally hold said valve member in a position closing the port between the second and third chambers, a pressure-responsive bellows housing said coil spring and acting in opposition thereto under the influence of pressure surges of the oil entering the valve inlet and the second and first chambers to move said valve member from a position closing the port between the second and third chambers to a position closing the port between the first and second chambers and a valve member in the fourth chamber having a thermal-responsive element connected thereto and exposed to the oil passing through said fourth chamber, the latter valve member having an open position permitting oil to flow through the port between the third and fourth chambers and acting to close said port when the temperature of the oil in said fourth chamber rises.

WELDON WORTH.

REFERENCES CITED

The following references are of record in the file of this patent:

UNITED STATES PATENTS

| Number | Name | Date |
| --- | --- | --- |
| 2,275,576 | Ware | Mar. 10, 1942 |
| 2,307,300 | Ramsaur | Jan. 5, 1943 |
| 2,322,047 | Mormile | June 15, 1943 |
| 2,323,994 | Hilt | July 13, 1943 |
| 2,326,096 | Dillman | Aug. 3, 1943 |
| 2,332,995 | Eaton | Oct. 26, 1943 |
| 2,344,207 | Hannon | Mar. 14, 1944 |
| 2,352,704 | Garner | July 4, 1944 |
| 2,353,577 | Magrum | July 11, 1944 |
| 2,359,448 | Shaw | Oct. 3, 1944 |
| 2,379,109 | Shaw | June 26, 1945 |
| 2,387,426 | Andersen | Oct. 23, 1945 |
| 2,396,053 | McEntire | Mar. 5, 1946 |
| 2,405,831 | Jensen | Aug. 13, 1946 |
| 2,417,708 | Shaw | Mar. 18, 1947 |